(12) United States Patent
Decker

(10) Patent No.: US 7,105,039 B2
(45) Date of Patent: Sep. 12, 2006

(54) OZONE REMEDIATION APPARATUS AND METHODS

(76) Inventor: Scott Decker, 230 Hidden Valley Rd., Wytheville, VA (US) 24382

( * ) Notice: Subject to any disclaimer, the term of this patent is extended or adjusted under 35 U.S.C. 154(b) by 0 days.

(21) Appl. No.: 10/787,346

(22) Filed: Feb. 26, 2004

(65) Prior Publication Data

US 2004/0237782 A1 Dec. 2, 2004

Related U.S. Application Data

(60) Provisional application No. 60/450,457, filed on Feb. 26, 2003.

(51) Int. Cl.
*B01D 53/14* (2006.01)
(52) U.S. Cl. .......................... 95/187; 95/229
(58) Field of Classification Search .................. 95/149, 95/187, 211, 229; 96/235; 210/760
See application file for complete search history.

(56) References Cited

U.S. PATENT DOCUMENTS 4,410,339 A * 10/1983 Bachhofer et al. ............. 96/226
5,279,963 A * 1/1994 Hobby ......................... 435/266
6,280,696 B1 * 8/2001 Hsu et al. ................. 423/245.1
6,322,756 B1 * 11/2001 Arno et al. .................. 422/171
6,645,450 B1 * 11/2003 Stoltz et al. ............. 423/245.2
6,780,223 B1 * 8/2004 Lin et al. ........................ 95/156

FOREIGN PATENT DOCUMENTS

CN          1428185 A  *  7/2003

* cited by examiner

Primary Examiner—Frank M. Lawrence
(74) Attorney, Agent, or Firm—Shughart Thomson & Kilroy PC

(57) ABSTRACT

A method and apparatus is provided of adding ozone and ozone and oxygen and ozone and another oxidizer such as chlorine dioxide or an acidifying agent to contaminated environments including high pressure work sites such as wells and sewage pipes and into high temperature solutions such as scrubber water. An apparatus is provided for on-site generation of oxygen and the generation of high pressure oxygen for use in contaminant remediation.

1 Claim, 2 Drawing Sheets

OZONE REMEDIATION APPARATUS AND METHODS

CROSS REFERENCE TO RELATED APPLICATION

This application claims priority from Provisional Application Ser. No. 60/450,457, filed on Feb. 26, 2003.

STATEMENT REGARDING FEDERALLY SPONSORED RESEARCH

Not relevant.

FIELD OF THE INVENTION

The present invention relates to a method and apparatus for removal of pollution using ozone and/or high pressure oxygen.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Flue Gas Remediation with Ozone and Chlorine Dioxide

Figure 1:
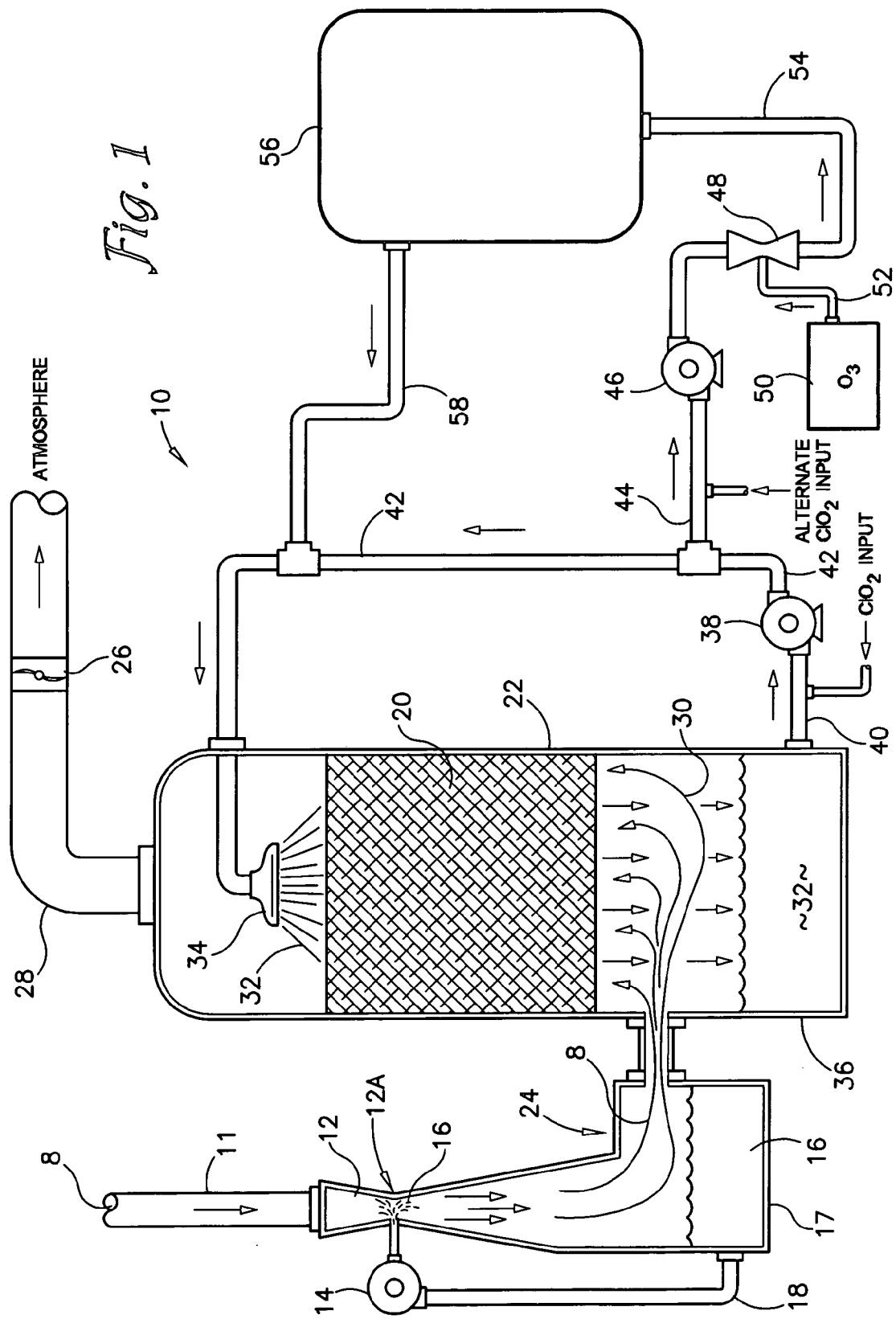
FIG. 1 is a schematic diagram of an apparatus for using a method of oxidation of gas stream pollutants using a mixture of chlorine dioxide and ozone at elevated pressure in a contact tank or pressure vessel to remove volatile organic compounds (VOCs) and nitrogen oxide ($NO_x$) compounds form the gas stream.

Referring now to FIG. 1, the ozone oxidation system for flue gases is shown in schematic form. A stream of flue gas 8 is taken from a boiler flue by vent pipe 11. The amount of flue gas taken from the boiler can be the entire flue gas stream or a portion of the flue gas stream. It will be appreciated that most operators of boilers are attempting to achieve compliance with environmental regulations and therefore the emission of some flue gases into the atmosphere is permitted. Therefore, it is often in the best economic interest of the boiler operator to treat only a portion of the boiler flue by using a side stream take off from the boiler flue and directing that side stream of flue gas into the treatment method and apparatus of the present invention via a side stream take off directed to pipe 11. The flue gases 8 are directed toward venturi 12. In venture 12, the flow of cooling water 16 draws flue gases 8 into venturi 12 and through constriction 12A of venturi 12. In addition cooling water can be sprayed or atomized into flue gasses 8 to cause further mixing of the cooling water with gas stream 8. The flow cooling water into venturi 12 is assisted by pump 14 which draws water 16 from cooling water basin 17 through pipe 18 to pump 14 whereupon it is injected into venturi 12 to draw in and cool flue gases 8 traveling through side stream pipe 11. Once the flue gases have mixed with the cooling water in venturi 12, the flue gas temperature is reduced from as high as 500 degrees Fahrenheit in pipe 11 to a more moderate temperature of about 200 degrees Fahrenheit. It is important to cool the flue gases for two reasons. The first is that oxidizing agents have difficulty functioning with flue gases which are at high temperatures. The second reason is that high temperature flue gases can damage packing 20 contained within scrubber 22.

As the hot flue gases 8 mingle with the cooling water in venturi 12, the cooled gases are drawn out of cooling chamber 24 and into scrubber 22. The flow of gases into scrubber 22 is assisted by exhaust fan 26 which is located in exhaust stack 28 of scrubber 22. Fan 26 serves to pull gases 8 up through scrubber 22. It will be appreciated that while some contaminates are pulled out of flue gas 8 by cooling water 16 as it is sprayed into venturi 12, the amount of contaminates contained in cooling water 16 is relatively small. The first reason for this small transfer is due to the heat of the gases initially and the fact that there is little material contained in cooling water 16 which is able to oxidize any of the pollutants contained in flue gas 8, therefore any transfer of contaminates between the gas phase and the liquid phase will be minimized due to the rapid saturation of cooling water 16 with the limited amount of contaminates that can be held in cooling water 16.

As the cooled flue gases 8 enter scrubber 22, they are drawn upwardly through packing 20 where the flue gases 8 mix with water 32 which is sprayed onto the top of packing 20 by spray head 34. The spray head is positioned near the top of scrubber 22 and above packing 20. The water sprayed by head 34 trickles down through packing 20 and commingles with the flue gases 8 which are traveling upwardly through packing 20. This contact between water 32 and gases 8 causes the transfer of pollutants from the upward moving gases 8 into the water liquid phase 32 which is traveling downwardly through packing 20. Those skilled in the art will appreciate that packing 20 is, to a large degree, inert and does not participate in any sort of chemical manner with either flue gas 8 or water 32 as the water and gas commingle within packing 20. The purpose of scrubber packing 20 is to increase the available surface area in scrubber 22 to provide a greater amount of surface area contact between gas 8 and water 32 to assist the transfer of pollutants between the two phases. The principal object of the scrubber being to remove the contaminates from gas 8 to allow cleaner gas which is compliant with environmental standards to be exhausted through the top of stack 22 through vent 28 past fan 26 and into the atmosphere.

As has been previously stated, during the course of gas 8 traveling through packing 20 of stack 22 and being exposed to water 32 which is being sprayed downwardly from spray head 34, the contaminates in the gas 8 are transferred into the water 32. In particular these contaminates are mainly comprised of volatile organic compounds (VOCs) and nitrous oxide and other oxide compounds of nitrogen ($NO_x$, generally). Such VOCs and $NO_x$ compounds are the principal contaminates from flue gas, and are removed from gas 8 and absorbed into water phase 32 as the two phases transit packing 20. After leaving packing 20, water 32 will contain some portion, usually a large portion of the contaminates that were previously contained in gas 8, and the contaminates will be carried with the down flowing water into scrubber water basin 36 which is at the base of scrubber 22.

To maintain the operation of scrubber 22, it is necessary to either purge the contaminate filled water 32 which is residing in scrubber water basin 36, or to treat the scrubber basin water 32 and recirculate it within scrubber 22 to remove additional contaminates from flue gases 8. Typically it has been considered to be more environmentally and economically sound to treat contaminate filled water 32 and to then recirculate it within scrubber 22 to remove additional contaminates from flue gases 8. The treatment of contaminated water 32 has, in the past, generally been accomplished using chlorine dioxide ($ClO_2$) as an oxidizer to reduce or eliminate the VOCs and $NO_x$ that are contained in scrubber water basin water 32.

To clean the scrubber basin water 32 for reuse, water 32 is drawn out of scrubber basin 36 by pump 38 which is attached to scrubber basin 36 by supply line 40. As water is drawn through supply line 40 by pump 38, $ClO_2$ is added to the water by an input line connected to supply line 40. In typical prior art applications that were not cleaning a hot water such as results from boiler flue gasses 8, only chlorine dioxide was added to the water. The $ClO_2$ alone was relied upon to oxidize a sufficient amount of VOCs and $NO_x$ to reduce the contaminate level in water 32 sufficiently so additional contaminates could be scrubbed from gases when water 32 was again sprayed onto packing 20 by sprayer head 34. However, in applications in which the gas being cleaned is a flue gas, the temperature of scrubber water 32 can be higher than the normally accepted range for effective use of chlorine dioxide. For example, if the temperature of water 32 after contacting flue gas 8 is greater than 110 degrees Fahrenheit, chlorine dioxide becomes ineffective for use as an oxidant. Similar limitations are present for ozone. Ozone is not very soluble and not very effective in treating contaminants in water when the water temperature approaches 130 to 135 degrees Fahrenheit. With the pressure injection and pressure contact of the present invention, ozone and chlorine dioxide successfully continued to be effective in oxidizing water contaminants at temperatures of up to 140 degrees Fahrenheit.

In the application of the present invention to the cleaning of flue gas, the cooled flue gas, after leaving venturi 12 and cooling chamber 24, is still at a temperature of about 200 degrees when the flue gas 8 enters scrubber 22. While the gas is substantially cooled as it passes through the water filled scrubber packing 22, the heat from gas 8 is transferred to water 32, and thus water 32 in scrubber basin 36 will typically be in excess of 110 degrees and can be as high as 130 degrees. At these temperatures, chlorine dioxide becomes an ineffective means of reducing the VOCs and $NO_x$ contained in the scrubber basin water 32. The present invention, however, avoids this limitation of chlorine dioxide and allows the oxidation of contaminates in scrubber basin water 32 at temperatures as high as approximately 140 degrees Fahrenheit. The apparatus and method which allows this oxidation of higher temperature water to be accomplished will be described hereinafter.

As previously described, contaminate filled scrubber basin water 32 is drawn off of scrubber basin 36 by pump 38, and the water 32 is charged with chlorine dioxide from supply line 40. After leaving pump 38, the chlorine dioxide charged water passes along return pipe 42, and a portion of the chlorine dioxide charged water is diverted into side stream take-off pipe 44. The contaminated water 32 which is not diverted by pipe 44 continues in return pipe 42 to sprayer head 34 at the top of scrubber 22 and is sprayed back onto packing 20 to receive additional contaminates from flue gases 30.

The portion of water 32 which is diverted into take-off pipe 44 is directed toward pump 46. It should be appreciated that under the present apparatus and method, chlorine dioxide can be added in one or both of two locations as is desired by the operator. The first point for injection of chlorine dioxide has been described and is conveniently located in the vicinity of the intake line to pump 38. The second convenient location for injecting chlorine dioxide into the contaminated water 32 is prior to pump 46. In the present apparatus and method, two pumps 38, 46 are utilized as pump 38 is sized to move a larger volume of water between water basin 36 and sprayer head 34, and pump 46 is sized to move a smaller volume of water. That smaller volume of water 32 is the water traveling through pipe 42, toward a means of adding ozone to the chlorine dioxide charged scrubber basin water 32. The water 32, after being charged with ozone, is directed to a pressurized holding chamber 56 wherein the oxidizers are allowed to react with the VOCs and $NO_x$ contained within the scrubber basin water 32.

Now, in further detail, once a portion of scrubber basin water 32 is drawn off of pipe 42 and into pipe 44, it may be charged, or additionally charged, with chlorine dioxide as previously described. Water 32 in line 44 is acted on by pump 46 to raise the pressure of water 32 sufficiently to allow the water to flow through venturi 48 and draw ozone into water 32 through use of venturi 48. Ozone, produced by ozone generator 50, is drawn into the water stream at venturi 48 from line 52. The VOC and $NO_x$ contaminated scrubber basin water 32 which is now charged with both chlorine dioxide and ozone ($O_3$) is then passed along line 54 and into contact vessel 56. In contact vessel 56, the contaminated scrubber waste water 32 which now contains oxidants chlorine dioxide and ozone is allowed to reside and to mix and to react within contact vessel 56 to reduce the VOCs and $NO_x$ contained within the scrubber basin water 32. The water/chlorine dioxide/ozone and contaminant mixture in contact vessel 56 is under a slight pressure of about 25 pounds per square inch due to the pumping pressure created by pump 46 and the slightly restricted out flow from contact vessel 56 caused by line 58. The combination of the pressure within vessel 56 with ozone allows the ozone and chlorine dioxide to effectively reduce the VOC and $NO_x$ content of scrubber basin water 32 dramatically. This is accomplished while the temperature of water 32 is approximately 110 degrees or greater. Typically, at such a temperature, chlorine dioxide alone would have been ineffective to treat the VOCs and $NO_x$ either from loss of activity or from insolubility of the chlorine dioxide in the hot water. The restriction of outward flow from pressure vessel 56 by pipe 58 and the pressure created by pump 46 provides a sufficient pressure increase within vessel 66 to assist in the oxidation of contaminates by the ozone and chlorine dioxide. After a sufficient reaction time, normally in the range of a few seconds or minutes, within pressure vessel 56, the treated scrubber basin water 32 is allowed to exit pressure vessel 56 along line 58 and rejoin the bulk of the water being transported to sprayer head 34 in line 42.

As an alternative to using chlorine dioxide in combination with ozone, sulfuric acid may be used as an agent to lower the pH of the water into which the ozone is mixed. It has been observed that the use of the chlorine dioxide in the water has the effect of lowering the pH of the water. The use of sulfuric acid and, potentially, other inexpensive acids, as a pH lowering agent also appears to permit ozone to function effectively in oxidizing water contaminants at temperatures of up to 140 degrees Fahrenheit while reducing costs of operation. Most users of ozone insist on neutral or high pH environments to promote the formation of hydroxyl radicals. by contrast the present invention operates with a low pH to provide effective results for paper mill black liquor and recycled oil/antifreeze wastewater processes.

High Pressure Ozone Sparging Device

Figure 2:
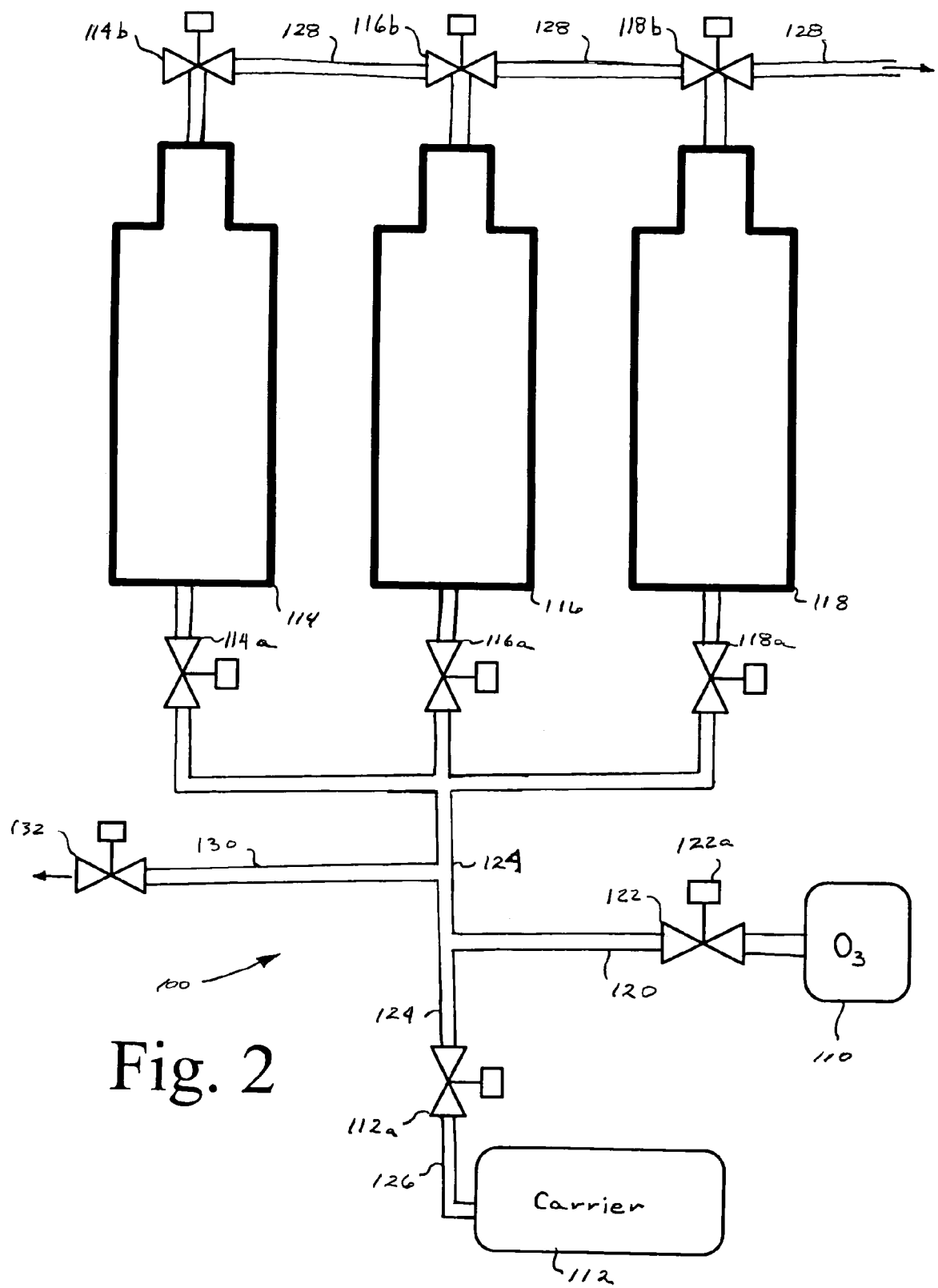
FIG. 2 shows an apparatus for providing high pressure ozone to sparging devices and the like comprising an ozone generator combined with a high pressure carrier gas feeding a series of distribution tanks to permit constant line pressure of the high pressure ozone-gas mixture.

Referring now to FIG. 2, the apparatus and method of use of a high pressure ozone sparging device will be described. Typically, one of the difficulties in injecting ozone into high pressure environments is that most ozone generators produce ozone at a relatively low pressure such as 15 psi. While high pressure ozone generators are available, their cost is generally very high, in the range of tens of thousands of dollars. Alternatively, it is possible to put ozone through a compressor in order to increase the pressure of the ozone, however, the heat and friction of the compression process tend to destroy a large percentage of the ozone (approximately 40 percent) during the process. Therefore, it would be useful if an inexpensive method of producing high pressure ozone were available which did not destroy large percentage quantities of the generated ozone in achieving the high pressure state. The present invention provides such advantages by combining an ozone generator with a high pressure carrier gas generator and a series of distribution tanks which can be selectively accessed to maintain a constant line pressure for delivery of high pressure ozone to a work site or work piece. Such a system of delivery of high pressure ozone or ozone and oxygen mixture can be used in sparging of wells and in the injection of ozone and ozone and oxygen mixtures into sewage pipes to accomplish reduction in hydrogen sulfide production resulting from anaerobic conditions in the pipe.

In FIG. 2, such a system 100 is shown in schematic form. Ozone is generated by a low pressure ozone generator 110. Such a low pressure ozone generator typically will produce ozone at a pressure of approximately 15 pounds per square inch (psi). Also connected to system 100 is a carrier gas generator 112 which provides a source of a carrier gas. The carrier gas can be any gas which will not destroy ozone such as nitrogen or air or the like. Carrier gas generator 112 could be in the form of an air compressor or a series of high pressure gas tanks which provide a carrier gas at a pressure that is sufficiently high so as to overcome the ambient pressure present in the work site or work piece as will be further discussed hereinafter. System 100 is further comprised of three holding tanks 114, 116, 118. These holding tanks are capable of containing gas at the pressures generated by carrier gas generator 112.

In system 100 operation ozone is generated by ozone generator 110, and the output of ozone generator 110 flows along line 120 which is opened and closed by valve 122. Valve 122, as all valves in system 100, can be a manual valve but a mechanized valve is most convenient. The mechanized valve is operated by motor 122A which can be radio frequency connected or hardwired connected to a computer operating a program to signal the proper opening and closing sequence according to the method described hereinafter. The generally low pressure ozone travels along pipe 120 until it reaches main branch pipe 124 whereupon the ozone is communicated to one of three pressure tanks 114, 116, 118. The pressure tanks are connected in series with valves 114A, 116A, and 118A controlling the input into tanks 114, 116, 118. Again valves 114A, 116A and 118A are preferably motor controlled valves which can be operated through use of a computer program. The ozone travels from pipe 120 to pipe 124 and is then deposited in one of the three holding tanks 114, 116, and 118. Once the selected tank fills with ozone to a pressure equal to that being generated by ozone generator 110, valve 122 in ozone line 120 is closed.

Valve 112A which is in line 126 connected to carrier gas generator 112 is opened to allow the carrier gas being generated by carrier gas generator 112 to flow into line 124 and into selected tank 114, 116, 118. The carrier gas can be produced at any pressure that is desired, and thereby acts to pressurize the selected tank 114, 116, and 118 to the pressure which is needed to overcome the pressure at the well sparger, pipe, work site or work piece. It will be appreciated that the carrier gas is being infused into the tank that already has been charged with ozone from ozone generator 110. The result is to raise the pressure in the selected tank to the pressure selected by the operator for the carrier gas. The addition of the carrier gas to the tank 114, 116, 118 containing the ozone will have a "diluting effect" and will reduce the partial pressure of the ozone within the tank. It will be appreciated by those skilled in the art that while the partial pressure of ozone in the tank is being reduced by the amount of carrier gas being introduced into the tank that there is comparatively little loss or destruction of ozone as is the case when the ozone is subjected to the heat and friction of a compressor in an attempt to obtain high pressure ozone.

Once the selected tank 114, 116, 118 has achieved the desired pressure due to addition of the carrier gas, the associated valve 114A, 116A, 118A is closed, and the previously described process is repeated for one of the other tanks in the series 114, 116, 118. For example, if tank 114 was selected to be first filled, once tank 114 was filled and valve 114A closed, valve 116A would immediately open nearly simultaneously with valve 122 and ozone would be directed from generator 110 into tank 116 until the pressure of ozone in tank 116 equaled the pressure of ozone being generated from ozone generator 110. At that point, valve 122 would close and valve 112A would open to allow the carrier gas to flow from carrier gas generator 112 into tank 116 to raise the total pressure within tank 116 to the pressure desired by the operator to overcome the ambient pressure in the pipe, well sparger head, work area or work piece. This sequence of events can again be repeated for tank 118 and any additional tanks which might be added to the series of tanks shown in FIG. 2 for system 100.

Once any one of tanks 114, 116, 118 has been charged with ozone and pressurized with carrier gas from carrier gas generator 112, the contents of the tank can then be piped to the well, pipe, work site or work piece to provide the oxidative power of ozone to the work site or work piece. Again, in operation, if tank 114 is the tank filled with ozone and carrier gas valve 114B is opened and the ozone and carrier gas flow out of tank 114 and along line 128 to the work site or work piece requiring the ozone.

As an example of a typical work site or work piece which would require ozone oxidation, a remediation project of well water would be one example of such a situation. When underground water is contaminated, wells frequently are dug to inject water treatment materials into the contaminated well water. While various forms of treatment are available, those forms of treatment must overcome the pressure of the underground fluid against the well piping. Typically, a pressure of 15 pounds per square inch as is produced by a low pressure ozone generator will be insufficient to force ozone into the underground well water. Therefore, the higher pressures of ozone are required. As previously described, the use of compressors to convert low pressure ozone into high pressure ozone results in the destruction of as much as 40 percent of the ozone. The present system allows the low pressure ozone to be converted into a higher pressure ozone/carrier gas combination which can then be injected into the high pressure situation such as is presented in an underground water well requiring remediation.

Again referring to FIG. 2, system 100 is provided with vent line 130 which is connected to vent valve 132. This valve may be mechanically operated or may have a pressure gate on the valve which will open should the pressures in line 124 exceed those specified by the operator.

Another example of the application of the above method and apparatus is in the method of treatment of sewer mains or pipe in which raw sewage is forced from one pumping station to another by pumping of the sewage. The pumping distance can be as much a several miles from one station to the next. Between pumping episodes the pipes remain filled with sewage. Bacteria in the sewage are active, and the pipe can rapidly become an anaerobic atmosphere containing bacteria that produce hydrogen sulfide ($H_2S$)—the smell associated with rotten eggs. The accumulation of the hydrogen sulfide is a substantial problem as it can be explosive a sufficiently high levels, it smells terrible, and the hydrogen sulfide is corrosive to the materials of the pump station. To avoid the production of the hydrogen sulfide, a substantial amount of money is spent each year to add chemical treatments to control the hydrogen sulfide production. The present method and apparatus eliminates the hydrogen sulfide production and eliminates the expense of the chemical treatments.

By use of the present invention, the oxygen level or dissolved oxygen (DO) of the sewage in the pipes can be increased by injection of a combination of oxygen and ozone into the high pressure sewage transfer pipes. The increased DO does not have sufficient ozone to kill the bacteria, but the overall increase in DO, in addition to the ozone, may provide for a less friendly environment for anaerobic organisms and/or may shift the pipe environment from an anaerobic atmosphere to an aerobic atmosphere thus eliminating the activity of the hydrogen sulfide producing bacteria. The result is, at least, a partial destruction of the organisms which slows $O_2$ consumption while at the same time adding DO to prevent an anaerobic condition in the sewer pipe.

Low Horsepower-High Pressure Oxygen Generator System

The EPA has established a standard that requires all water being reintroduced back into a natural creek, stream or river to have a "DO" or dissolved oxygen level of 10.0 during the winter months and 7.9 during the summer or warmer months. The apparatus of the present invention allows these goals to be achieved at lower cost and higher efficiency than previous systems. The inventive apparatus also can be used to add oxygen to high pressure systems.

The apparatus comprises fractional horsepower compressors that are used to operate small oxygen concentrators. The oxygen concentrators operate on the PSA or pressure swing absorption method for oxygen concentration. The produced oxygen then flows into fractional horsepower compressors which boost the pressure of the produced oxygen to pressures as high as 195 psi. The high pressure, high purity oxygen is then sprayed into the wastewater at the bottom of a forced or pumped sewage main pipe through a high pressure nozzle to effectively diffuse the concentrated oxygen into the pressurized bottom of the forced main without the use of an ozone generator. The high pressure oxygen produced had a flow rate of 46 standard cubic feet per hour and resulted from use of approximately one horsepower at 115 volts AC.

This apparatus provides a substantial benefit as it incorporates high electrical efficiency and the use of low cost compressor components in the systems. This combination of low cost compressor components and high electrical efficiency allows the introduction of oxygen into a pressurized system while avoiding the need to add ozone to the oxygen to increase solubility of the oxygen. This is accomplished by taking advantage of the low cost and high efficiency of the system to provide such a cost efficient production of oxygen as to allow the injection of twice the amount of oxygen into the pressurized system and thereby achieve the same results as are achieved with the use of ozone to increase the solubility of oxygen. This is accomplished by eliminating the cost of an ozone generator for ozone production and while eliminating the need to keep liquid oxygen and liquid nitrogen or tanks of oxygen at the oxygen injection site of the pressurized system to provide the oxygen for introduction into the system.

Now, a particular embodiment of the system will be described in greater detail. The oxygen generating system consists of (3) cabinets, (2) oxygen generating units and (1) booster unit each 30 by 30 by 12 inches and are all wall mountable. The systems offers the advantage of producing oxygen upon demand from air using the PSA or Pressure Swing Absorption methodology. In PSA oxygen production normal air is compressed and sent through a fractionator, also known as an oxygen generator, where oxygen is extracted using a simple sieve process. At high pressure, oxygen passes through the sieve and nitrogen is captured by the sieve. When the system is returned to atmospheric pressure, the nitrogen is released from the sieve and the process can start over with the introduction of pressurized air to the sieve.

At this point, the oxygen is 90 to 95 percent pure but is low in pressure. For this reason a booster unit was designed to boost the oxygen output from each oxygen generating units. This gives the system operator the ability to adjust the oxygen output pressure from 0 to 175 psi as required. A second advantage is the low cost of oxygen production. The total cost of running all 3 units is the equivalent to running a 2 horse motor.

The system has been designed so that either of the oxygen generators can be used as the primary oxygen generating unit, with the second unit serving as a back up unit or when additional DO is required, both units work in tandem. Each unit has been designed to provide to the customer two very important capabilities. First is the capacity to remotely control the on/off switching of either of the 2 generators. Second, each unit comes equipped with an oxygen purity board. Its function is to sample the percent of oxygen being produced from each of the oxygen generator units and display the results. On each unit is a small red light, and should the purity level fall below 88 percent and stay below that set point for more than 15 minutes, the red light illuminates. The light will remain in this state until the situation is corrected. Two contacts on the oxygen purity board have been made available, so if, in the future, the customer wants to monitor the oxygen purity from a remote location, he has that ability.

The booster unit consists of two separate, stand-alone compressor systems, all within one cabinet. Each booster system is powered only when the corresponding oxygen generator is in the "on" mode. Both booster systems combine to provide a single high-pressure output for the customer to connect exterior tubing.

In placing oxygen monitor sensors, they should be located in positions most likely to experience an oxygen-deficient atmosphere, and the alarm should be clearly discernible at the point of personnel entry.

The setup procedure for the system is as follows. Mount all three cabinets in the desired location with the oxygen generator unit #1 on the far left, and the OXBU3-1 booster unit, on the far right. All three cabinets are predrilled for wall mounting purposes. Cabinets either can be fastened directly to the masonry wall using appropriate masonry fasteners or u-channel installed as mounting supports for the cabinets, fastening each cabinet to the u-channel with the appropriate hardware.

Liquid-tite fasteners are installed in the back-side corners of each unit to allow for electrical connections to be made starting from the left side of the oxygen compressor, unit #1, then through the oxygen compressor unit #2 and last terminating in the booster unit on the far right. The installer shall provide the appropriate liquid-tite hose, using the fittings provided to connect unit #1 with unit #2, which in turn connects to the booster unit. Each oxygen generator unit is wired separately, each on its own 120 v, 15/20 amp breaker. The booster unit, which consists of two separate internal booster systems, receives its power from the two oxygen compressor units. Though separate systems, the output of each booster system combines to provide the customer a single source, high pressure output. As an example, if the oxygen compressor, unit #1, is running, then power is supplied to booster #1 through the red/gray leads stemming from the contactor in the oxygen compressor, unit #1. On the other hand, booster #2 is fed from the violet/gray leads from the oxygen compressor, unit #2. Within each oxygen compressor, dry contacts are provided to allow for connection of remote on/off switch capabilities.

As part of the initial setup, it is recommended that all external fittings be pressure tested while the system is running to check for possible leaks which could lead to loss of potential oxygen usage and a potential hazard as mentioned in the safety section. While the system is running, a sudsing agent (i.e., Windex) should be sprayed on each connection to verify oxygen is not leaking from that connection. Tighten any connection that has indicated a leak and retest. After all connections have been tested, wipe off any residual sudsing agent. It is strongly recommended that cool air venting be provided and ducted to each of the three units. Not only will this serve to maintain an appropriate temperature level within each unit, it will provide a fresh oxygen source to each of the oxygen generators.

The system as a whole can be set up in one of two conditions. The units can be turned on manually at their installed location or can be remotely turned on or off at the discretion of the plant operator. It is important to note that safety by-pass switches have been installed on each of the two oxygen generators. The reason this is pointed out is because, if the operator chooses for the time being, to not connect the remote capabilities or the remote switch fails, both the master switch and the by-pass switch on each of the oxygen generators should be in the up or on position for the unit to work. The by-pass switch in this case would emulate the remote switch. If the system operator chooses to connect the remote switching capabilities, then the master switch should be in the up position and the by-pass switch down in the off position when turned on or off from a remote location. In this condition, a technician may switch the unit off, using the master switch, thus negating the on condition set from the remote switch. This condition may be for maintenance, testing, replacement, additions, safety, etc. Depending on the needs, one or both of the oxygen generators can be turned on.

Prior to turning on each unit, open all valves and flowmeters to allow open flow. Switch master switch and by-pass switch (depending on remote scenario) to the on position. Delays have been installed in the oxygen generator unit to allow each of the two compressors to relieve any back-pressure prior to startup. The delay has been pre-set at approximately 45 seconds during testing. It is recommended that the delay not be set lower than 45 seconds. The delay may be adjusted to allow more time for the compressor to relieve back-pressure. If either or both compressors have not started after the delay time allowance, open unit and set delay for one minute. If both compressors are running, the oxygen pressure gauge on the oxygen generator unit should read 7–8 psi. Should only one compressor be running, the pressure gauge would read 4–5 psi. Like the oxygen generator each booster system is equipped with the same type delay and relieving.

Next adjust the appropriate flowmeter on the booster unit to the corresponding oxygen generator. During normal operation, the flowmeter should be adjusted to read 40 SCFH at all times. After the flowmeter has been adjusted and holding steady, adjust the high pressure output by adjusting the knob labeled "pressure adjustment" on the right side of the booster unit. Output pressure can be adjusted anywhere from 0 to 175 psi. Be sure at this point to tighten down the lock nut on the needle valve prior to moving to terminating setup. Finally check the "oxygen purity level" on the oxygen readout indicator. Indicator should read between 90 to 95 percent oxygen. Best performance is when the indicator reads between 91.0 & 92.5 percent pure. Note, the unit should never be continuously run if indicator read below the 90.0 percent purity level. Damage can and will occur to the unit.

During normal operation, either unit can be designated as the primary running unit with the other as backup. Or, if demand requires (measured dissolved oxygen falling below set points), both units may be initiated. Because the units have been designed with check valves, it is not necessary to close any valves or adjust any flowmeters to an off position.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive ozone remediation apparatus and method are constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A method of treating flue gas stream comprising:
   a. cooling the flue gas stream,
   b. allowing the cooled flue gas to flow in a first direction across a packing of a gas scrubber,
   c. providing a water supply,
   d. adding chlorine dioxide into said water supply to provide a water mixture,
   e. injecting ozone into said water mixture to form an ozone and water mixture, and
   f. allowing said ozone and water mixture to flow to cross said packing in a second direction.

* * * * *